United States Patent [19]
Meyer

[11] Patent Number: 5,458,727
[45] Date of Patent: Oct. 17, 1995

[54] DIRECT EXTRUSION CUSHION-GUMMING AND SKIVE-FILLING OF TIRE CASINGS FOR RETREADING

[75] Inventor: Paul Meyer, Ascona, Switzerland

[73] Assignee: AZ Formen- und Maschinenbau GmbH, Munich, Germany

[21] Appl. No.: 138,483

[22] Filed: Oct. 15, 1993

[30] Foreign Application Priority Data

Aug. 5, 1993 [DE] Germany .................. 43 26 370.4

[51] Int. Cl.⁶ ................................. B29D 30/56
[52] U.S. Cl. .................. 156/405.1; 156/96; 156/500; 156/909; 425/17
[58] Field of Search ................... 156/96, 394.1, 156/909, 500, 405.1; 425/17

[56] References Cited

U.S. PATENT DOCUMENTS

| | | |
|---|---|---|
| 2,405,802 | 8/1946 | Taber . |
| 3,808,076 | 4/1974 | Barwell ........................... 156/96 |
| 5,162,070 | 11/1992 | Meyer . |

FOREIGN PATENT DOCUMENTS

| | | |
|---|---|---|
| 0005077 | 10/1979 | European Pat. Off. . |
| 0528683 | 2/1993 | European Pat. Off. . |
| 7722974 | 7/1977 | France . |
| 2122522 | 11/1971 | Germany . |
| 1729555 | 3/1972 | Germany . |
| 4025459 | 2/1991 | Germany . |
| 4203027 | 8/1993 | Germany . |
| 1590378 | 6/1981 | United Kingdom . |

*Primary Examiner*—Geoffrey L. Knable
*Attorney, Agent, or Firm*—Robert W. Becker & Associates

[57] ABSTRACT

A tire retreading device has a tread feeding device for feeding the tread to a tire casing and an extruder for extruding a cushion gum layer onto the tire casing. The extruder has a first and a second lip defining the extrusion die. The first lip, positioned behind the second lip in the direction of rotation of the tire casing, projects in a direction toward the tire casing relative to the second lip. The first lip is an applicator shoe that is pressed under prestress against the tire casing so as to deform the tire casing. With the retreading device a cushion gum layer is applied to the tire casing and during the application the applicator shoe is pressed against the tire casing with such a pressing force that a radius of curvature of the tire casing conforms to a radius of curvature of the applicator shoe. With this measure, depressions in the surface of the tire casing are filled with excess cushion gum.

15 Claims, 2 Drawing Sheets

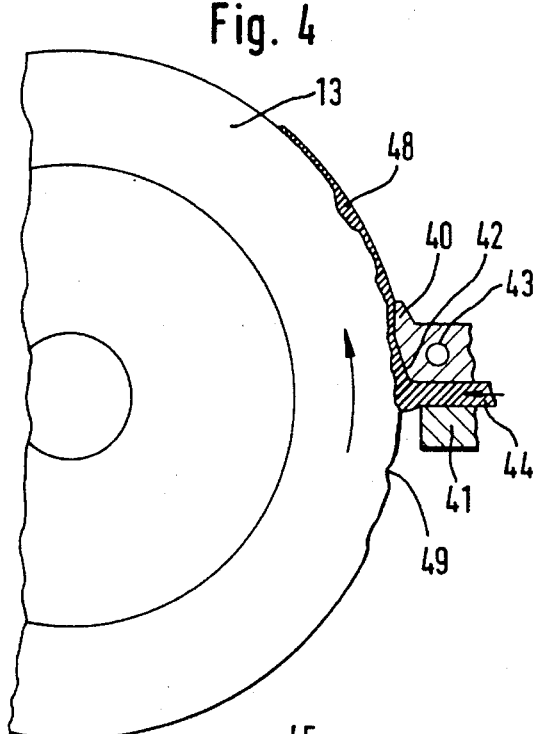
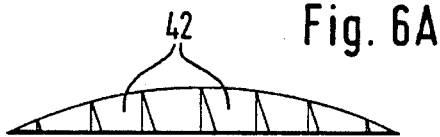
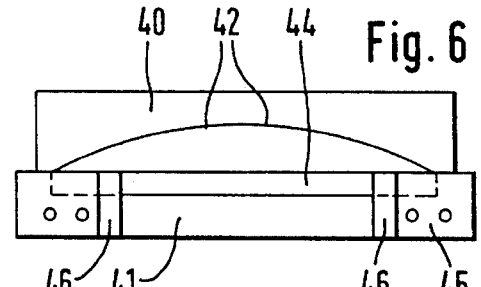
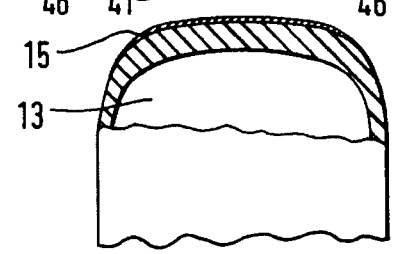
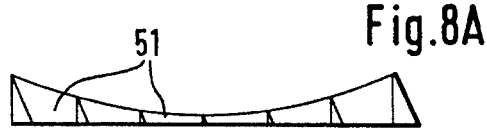
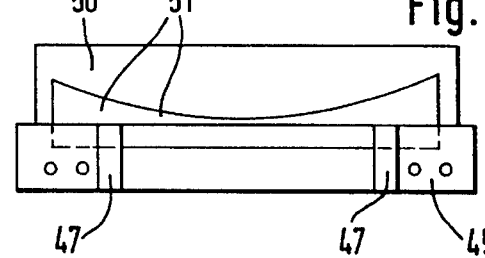
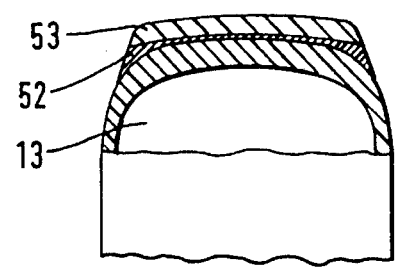
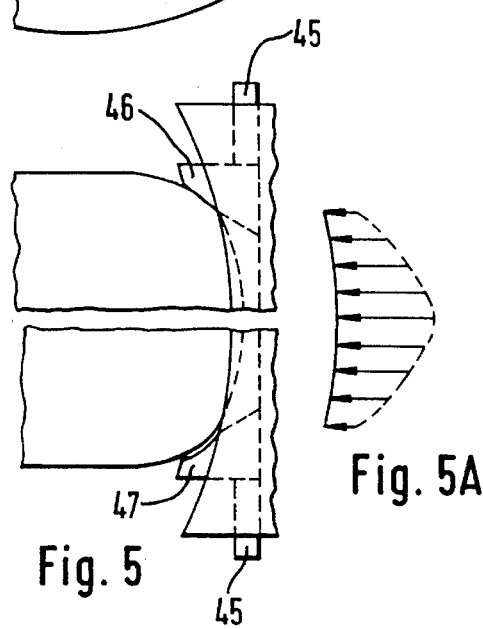

DIRECT EXTRUSION CUSHION-GUMMING AND SKIVE-FILLING OF TIRE CASINGS FOR RETREADING

BACKGROUND OF THE INVENTION

The present invention relates to a retreading device for tires in which a tread strip is applied to a carcass, the device comprising a tread feeding device for feeding the tread to the carcass and an extruder for extruding a cushion gum layer, the extruder having two lips defining the extrusion die. The downstream lip projects past the upstream lip in the direction toward the carcass.

Tire re-treading is carried out conventionally by two basic methods:

A. Mold cure retreading where the casing is prepared by applying a blank tread of uncured rubber with a cushion gum layer facing the casing and then curing the thus prepared green tire. The tread pattern is impressed on the blank in the mold and is bonded to the casing by the application of heat and pressure. The mold can receive only one tire at a time. The vulcanization temperature is generally at about 150° C. This method is expensive.

B. Precure retreading where a tread, already cured and patterned in a flat mold or a ring mold and sized to fit the casing, is bonded to the casing by a thin layer of uncured binding or cushion gum that is subsequently cured. This is done at much reduced pressure and temperature (between 95° and 120° C.) in an autoclave, in which generally a number of tires are so treated at the same time. This is far less expensive.

Both methods require the preparation of the casing (carcass), the removal of the worn tread, and a buffing step to generate a uniform surface, curved in a plane through the axis of the tire in the so-called buffing contour or buffing radius. This results in a predetermined degree of roughness to enable the bonding of the new tread to the casing.

Especially in the retreading of truck tires, which represent much bigger unit values than automobile tires, a separate operation of repairing local damage which becomes apparent on the buffed surface has to be carried out. This is done by grinding the damaged area to expose a roughened, but non-ragged surface, an operation known as skiving. Thereafter the "skives", also called "buzz-outs", are filled with heated repair material, which is also mostly cushion gum. This is often done with small extruders the size of hand-tools in a labor-intensive operation requiring much care and attention.

Especially in precure retreading, the binding gum has historically been prepared by a calendering operation as a wide sheet. Processing temperatures commonly do not exceed 80° C. The sheet is cooled and rolled up with intermediate plastic layers to be later cut into widths corresponding to different sizes of tire and to be applied as part of the labor-intensive process of "building" a precured tire.

The binding gum (cushion gum) thus prepared has the disadvantage that due to its compounding, designed to provide a reasonable time of curing in the autoclave, the sheets begin to "age" in storage, i.e., the binding gum already cures to such an extent that it can no longer fullfil its bonding funchion later. By the same token, it is prone to "scorching" in an extrusion operation unless extrusion is carried out under very carefully controlled conditions, especially when the extruded sheet has to be as thin or thinner than the calendered sheet.

This involves extrusion dies having the width of a casing, i.e., approximately between 140 and 350 mm, but of a slot height of less than the 1.2 or 1 mm thickness for the cushion gum and, depending on the swell-factor, considerably less, i.e., down to 0.4 mm. This results in the generation of a high back pressure during the extrusion operation, and it is thus impossible to keep the extrusion temperature in the range considered safe by the rubber suppliers, namely that of the calendering operation where exceeding the prescribed temperature range by 6° C. to 15° C. is already considered critical, depending on the compound.

As the guarantee for proper bonding is a liability of the rubber supplier, an extrusion apparatus for direct application of cushion gum to a buffed casing to be used by the individual retreader has found little support from the rubber suppliers for the aforementioned reasons.

Thus, although there have been direct application cushion gum extruders on the market for some years and also in use by a few retreaders, there has been no widespread application of this technology as yet.

Moreover, for the sake of safety of "green" adhesion, i.e. adhesion before curing, the conventional industrial practice of spraying the buffed and repaired casing surface with rubber solution has been retained even by the few users of direct cushion gum extrusion application.

However, such rubber solution contains volatiles which present a health hazard. Therefore, in some counties of California and one state of the Federal Republic of Germany, the use of such sprays has already been prohibited, and users must phase out this method. Most likely, this measure will spread worldwide.

U.S. Pat. No. 5,162,070 shows a binding or cushion gum extruder for direct extrusion onto a rotating tire casing. The layer of cushion gum basically has to be extruded to gauge— 1.2 mm thickness or less—and is pressed onto the crown of the casing with a gentle, elastic force whereby the die radius in the horizontal plane corresponds to the biggest "buffing-radius" occurring in practice. Outside the more or less wide band of applied pressure, the extruded cushion gum which cools very rapidly shrinks onto the outer casing areas and achieves good adhesion without air inclusion.

This principle works even when, for precured treads having thin "wings" or lateral flanks, cushion gum has to be applied 20 or 30 mm down the sidewalls of the casing. The speeds of extrusion are varied for width adjustment, carried out by mechanically moved side plates, and for affecting the thickness of the applied cushion gum layer. For this purpose, the adjustment of the casing rotation may also be used within limits. The adjustments may be interconnected and preprogrammed by a process controller.

European Patent Application 0528683A1 shows a similar apparatus in which a different way of adjusting the width of the extrusion to that of the casing is proposed, namely the rotation of the die head about its longitudinal axis out of the horizontal plane, in which it is situated for accommodating the greatest width of the buffed crown of the casing.

To ensure conformity of the crown of the casing to the radius of the die in all angular positions, the die is provided with a spacer lip contacting the casing at a position which, due to the rotation of the casing, is upstream of the extruded cushion gum. The other lip, at a given small distance from the buffed surface, then shapes the outside of the layer of cushion gum.

The German Patent Application DE 4025459 A1 teaches the spiral winding of a thin and narrow strip of extruded cushion gum onto a buffed casing. The spirally wound strips overlap edgewise which does not reliably avoid air inclusions. This reference shares this feature with the well-known method of strip-winding for building up tread blanks for mold curing, disclosed in German Patent # 1 729 555.

All three of these examples of the prior art operate the cushion gum extruders against small die slots, i.e. in the mode of high back-pressure produced by the die, and therefore in an extrusion temperature range in excess of the operating temperatures of the conventional calendering operation for cushion gum sheet. Also, none of these methods can effect skive-filling.

The French patent No. 7722974 deals with the filling of irregularly worn or damaged spots on unbuffed tires. It does so, however, in the context of applying a tread blank for mold cure retreading.

The means for achieving this is a die head with interchangeable dies, adapted to the desired contour of the tread. The die head is advanced to the crown of the casing without contacting it and spaced at a fixed distance thereto. The rubber is applied by the extruder. The rubber is then shaped from an agglomeration of rubber formed between the die outlet and the casing by rotation of the casing against the downstream lip of the die, the die opening being formed between the rotating casing and the downstream curved die surface. The radial distance between casing and downstream die surface determines the thickness of the blank built up on the casing.

Such machines have found application in mold retreading, although they have, as far as is known, been used only on casings buffed in the conventional way and have served to a limited degree the purpose of skive-filling. One reason for this is that the material filling the skives in this method is tread rubber, compounded for mileage and road-holding, and not the soft and sticky cushion gum normally used. A more important reason is that the pressure generated by the extruder and pushing on the agglomeration of plasticized rubber can freely expand and is not sufficient to ensure penetration of rubber into any but shallow skive holes, which must, moreover, be carefully shaped to allow easy flow of the rubber. In practice, this means that the skiving operator has to exercise judgement as to which skives to fill in the conventional manner and which to leave to the machine to fill. This introduces a factor of uncertainty in quality control which many retreaders find unacceptable.

In this method, the nature of the rubber application has made the joining of the beginning and the end of the extruded after a full rotation of the casing a problem and this joint or "splice" has generally required cleaning-up in an additional operation, involving cutting off excess rubber and hence producing potential waste.

It is furthermore disadvantageous that the thickness of the tread exhibits great fluctuations when the carcass is not exactly centered.

In view of the above, it is an object of the present invention to provide an apparatus for the direct extrusion application of a cushion gum to a buffed casing in a predetermined thickness under temperature conditions (about 80° C.) which approximate those in the calendering operation for conventionally made cushion gum in sheet form.

It is a further object of the invention to provide for an application under such pressure that penetration into the buffed surface is assured, i.e. that, given a clean buffed surface, rubber solution spraying for "green" adhesion is made superfluous, thereby avoiding environmental pollution and saving usually a complete work station.

It is a further object of the invention to reliably achieve skive-filling, thereby avoiding that this step be performed as a separate, labor-intensive, and quality-sensitive manual operation.

It is a further object of this invention to provide a method to be applicable not only for precure retreading where the cushion gum, being more costly than tread rubber, is applied in as thin a layer as possible, but also for mold cure retreading, where the cushion gum or base gum, especially for truck tires, can be less costly than the tread rubber. The cushion gum then can be applied thinner in the center of the crown of the casing with a build-up in thickness towards the shoulders to form a bigger proportion of the rubber applied for retreading as the base of a so-called "cap and base" tread, for achieving cost-saving on material as well as quality advantages.

SUMMARY OF THE INVENTION

The tire retreading device of the present invention is primarily characterized by:

A tread feeding device for feeding the tread to a tire casing;

An extruder for extruding a cushion gum layer onto the tire casing, the extruder having a first and a second lip defining an extrusion die, wherein the first lip positioned behind the second lip in a direction of rotation of the tire casing projects in a direction toward the tire casing relative to the second lip;

The first lip being an applicator shoe that is pressed under prestress against the tire casing so as to deform the tire casing.

Preferably, the applicator shoe has a chamfer that extends at an angle of 2° to 50° to a surface of a tire casing; most preferred, the angle is 10° to 30°.

In a further embodiment of the present invention, the applicator shoe projects by a length corresponding to 3 to 15 times a thickness of the cushion gum layer past the second lip of the extruder. The length is preferably substantially 10 times the thickness of the cushion gum layer.

Advantageously, between the applicator shoe and the second lip a spacing is provided that is substantially 2 to 12 times a thickness of the cushion gum layer. Preferably, the spacing is substantially 8 times the thickness of the cushion gum layer.

The applicator shoe, in a preferred embodiment, has a radius of curvature that is at least equal to a greatest radius of a surface of the tire casing. Expediently, the extruder according to the present invention heats the cushion gum of the cushion gum layer only to a temperature of substantially less than 80° C.

Preferably, the chamfer varies over the width of the tire casing. Preferably, the applicator shoe has a positive curvature so that the chamfer is greatest at a center plane of the tire casing. In another embodiment, the applicator shoe has a negative curvature so that the chamfer is greatest at side walls of the tire casing.

Advantageously, the cushion gum of the cushion gum layer has an adhesion to the tire casing and a viscosity such that the cushion gum is conveyed against a pressing force of the applicator shoe into a gap defined between the tire casing and the applicator shoe.

In a preferred embodiment of the present invention, the applicator shoe comprises a heating device for heating the applicator shoe during application of the cushion gum layer.

Preferably, the extruder has means for controlling electronically a supply of cushion gum to the extruder, wherein for controlling the supply a gum rolling bank is used as an indicator, the gum rolling bank being formed opposite the applicator shoe and being maintained by supplying new cushion gum at a level such that depressions and damaged areas of the surface of the tire casing are completely filled. The applicator shoe preferably has lateral forming projections connected laterally to the applicator shoe and an adjusting device connected to the lateral forming projections for adjusting a distance between the lateral forming projections to the width of the tire casing, wherein the lateral forming projections serve to guide the gum rolling bank.

The present invention further concerns a method for rereading tires which is primarily characterized by the following steps:

Connecting an applicator shoe to an extrusion die of an extruder;

Applying cushion gum to a tire casing with the extrusion die;

During the step of applying cushion gum pressing the applicator shoe against the tire casing with such a pressing force that a radius of curvature of the tire casing conforms to a radius of curvature of the applicator shoe; and Filling depressions in the surface of the tire casing with excess cushion gum during the pressing step.

Preferably, the inventive method further comprises the steps of:

Starting a rotation of the tire casing directly before activating the extruder;

Activating the extruder;

Building a thin cushion gum layer on the tire casing that is sufficient to cover the roughness of the surface of the tire casing;

Reducing a speed of extrusion after a complete revolution of the tire casing so that the amount of excess cushion gum after completion of the cushion gum layer has been reduced to zero.

In another embodiment of the present invention, the method is primarily characterized by the following steps:

Feeding a tread to a tire casing with a tread feeding device;

Extruding a cushion gum layer onto the tire casing with an extruder;

Providing the extruder with a first and a second lip defining an extrusion die, the first lip being an applicator shoe;

Positioning the first lip behind the second lip in a direction of rotation of the tire casing;

Arranging the first lip such that the first lip projects in a direction toward the tire casing relative to the second lip;

Pressing under prestress the applicator shoe against the tire casing so as to deform the tire casing.

Preferably, the method further comprises the step of providing the applicator shoe with a chamfer that extends at an angle of 2° to 50° to a surface of the tire casing, the angle most preferably being 10° to 30°.

Expediently, the applicator shoe projects by a length corresponding to 3 to 15 times a thickness of the cushion gum layer past the second lip of the extruder, most preferred, the length is substantially 10 times the thickness of the cushion gum layer.

In a preferred embodiment of the inventive method, the step of spacing the applicator shoe and the second lip at a spacing that is substantially 2 to 12 times a thickness of the cushion gum layer is suggested. The spacing is preferably substantially 8 times the thickness of the cushion gum layer.

Expediently, the method further comprises the step of shaping the applicator shoe with a radius of curvature that is at least equal to a greatest radius of a surface of the tire casing.

The method expediently further comprises the step of heating with the extruder the cushion gum of the cushion layer only to a temperature of substantially less than 80° C.

Preferably, the chamfer varies over the width of the tire casing. Preferably the applicator shoe has a positive curvature so that the chamfer is greatest at a center plane of the tire casing. In another embodiment, the applicator shoe has a negative curvature so that the chamfer is greatest at sidewalls of the tire casing.

Expediently, the inventive method further comprises the step of providing the cushion gum of the cushion gum layer with an adhesion to the tire casing and with a viscosity such that the cushion gum is conveyed against a pressing force of the applicator shoe into a gap defined between the tire casing and the applicator shoe.

Expediently, the method further comprises the step of heating the applicator shoe during application of the cushion gum layer with a heating device.

In another preferred embodiment of the present invention, the inventive method further comprises the step of controlling electronically a supply of cushion gum to the extruder, wherein for controlling the supply a gum rolling bank is used as an indicator, the gum rolling bank being formed opposite the applicator shoe and being maintained by supplying new cushion gum at a level such that depressions and damaged areas of the surface of the tire casing are completely filled. Preferably, the method further comprises the steps of connecting lateral forming projections to the applicator shoe and connecting an adjusting device to the lateral forming projections for adjusting a distance between the lateral forming projections to the width of a tire casing, wherein the lateral forming projections serve to guide the gum rolling bank.

Surprisingly, the inventive tire retreading device achieves a complete filling of holes or skives (depressions) within the tire casing surface upon conventional preparation, i.e., skiving of the damaged locations. This is favored by a suitable selection of the temperature of the cushion gum whereby due to the lower temperature the adhesion of the cushion gum to the tire casing is sufficiently strong such that a cushion gum layer against the pressing force of the inventive applicator shoe is entrained by the tire casing surface. Due to the strong pressing forces the formation of air inclusions is reliably prevented. At the same time, the lower temperature ensures that the cushion gum is worked within a safe temperature range so that the specifications of the cushion gum manufacturer can be maintained as within the calendering process.

After filling of the skives and holes within the tire casing in an automatic manner by the inventive spreading of the warm and tacky-soft cushion gum material, a manual filling, for example, with small repair extruders, is entirely obsolete.

It is especially advantageous that due to the applied pressing force the penetration of the cushion gum into the roughness of the tire casing surface is ensured. It is only necessary that the buffed casing surface is cleaned thus eliminating the spraying of a rubber solution for the adhesion of the tire tread and thereby eliminating environmental pollution and also eliminating a work station.

Since the cushion gum layer is applied with an excess of cushion gum, for example, in the form of a gum rolling bank, to the rotating tire casing, thereby safely filling holes and skives, it is possible to eliminate the process of manually filling damaged portions of the tire casing which with respect to quality assurance is labor-intensive and critical to the product quality.

The invention may not only be used for tire retreading with pre-cured tread strips in which cushion gum that is more expensive than the thread rubber is used for applying a thin cushion gum layer, but is also applicable for retreading with a curing mold where the base gum, especially for truck tires, is less expensive than the tread gum. This may then be achieved such that the base gum is applied thinner in the center of the tire casing and stronger towards the shoulders in order to apply a greater portion of the rubber needed for retreading as a base for the tire, as represented in FIG. 9. This results in cost and quality advantages.

It is especially advantageous when an extrusion die with two lips is provided which are adjustable at least with respect to the width of the tire casing to be covered and at least are spaced apart from one another by a multiple of a median thickness of the cushion gum layer. Accordingly, the extruder is advantageously operated at a low die resistance which allows for an extrusion temperature that corresponds substantially to the temperature of calendering a cushion gum sheet.

Additionally, the lip which in the direction of rotation of the tire casing is downstream of the desired cushion gum flow is spaced relative to the other lip by a spacing that exceeds by a multiple the medium thickness of the cushion gum layer to be applied and is formed as an applicator shoe which is in contact with the tire casing surface. It is especially advantageous when the applicator shoe has a curvature, which must not necessarily be circular, but must have a portion of a radius that corresponds at least to the greatest possible buffing radius of any tire to be retreaded, such that under a great pressing force of the extruder the tire casing is deformed in correspondence to this curvature.

According to a further preferred embodiment the applicator shoe has a chamfer having a depth that varies along its curvature.

During operation the cushion gum is thus extruded to form an agglomeration adjacent to this applicator shoe and is hydrodynamically entrained into the chamfer between the applicator shoe and the rotating tire casing and entrained into the gap. The agglomeration thus acts in the manner of a rolling bank of a mill or a calender, from which rolling bank the cushion gum is forced with the pressing force of the extruder into the buffed surface of the tire casing and into the holes or skives present. The great pressing force of the extruder deforms the surface of the tire casing in conformity to the curvature of the applicator shoe which makes obsolete the requirement of exchanging the extrusion die for differently sized tire casings.

A chamfer which is deep in the center and which is reduced towards the sidewalls generates the greatest pressure for the cushion gum flowing in the center portion of the tire casing in order to counter a pressure peak within the applicator shoe which deforms the surface of the tire casing against the stiffness of the steel belts. A chamfer with a flat center portion and greater depth towards the shoulders generates a cushion gum layer having a great thickness a the shoulders, which may be required for the base gum in mold curing.

The chamfer angle relative to the surface of the tire casing can be adjusted according to varying requirements. In a preferred embodiment the angle is, for example, 15°, however, substantially steeper or substantially lower angles or rounded recesses or rounded projections are possible. The length of the chamfer relative to the entire height of the applicator shoe, in the tangential direction of the tire casing, may, for example, be two thirds whereby in this case also substantial variations are possible. The length of the projection between the applicator shoe and the oppositely arranged lip of the extruder, for an average thickness of the cushion gum layer, can be, for example, ten fold, but other, substantially varying values may also be possible. The same holds true also for the distance between the applicator shoe and the oppositely arranged lip whereby this distance is preferably smaller than the aforementioned length of the projection.

The axis of extrusion preferably extends radial with respect to the tire casing.

According to a preferred embodiment lateral forming projections for adjusting the width of the extrusion to the different width of the tire carcass are provided. These projections may be provided with different curvature in three dimensions in order to generate alternative cross-sectional surfaces for the sidewalls of the cushion gum, including a slight local thickening with a sharp edge or a tapering downward along the sidewalls of the tire casing, or combinations of these effects.

The cushion gum extruder of the present invention is primarily characterized by an extrusion die, having two lips which adjustably cover at least the width of the crown of a buffed casing and which are spaced apart at least a distance which is a multiple of the median thickness of the layer of cushion gum to be applied, whereby the extruder is operated in a low die resistance mode for an extrusion temperature similar to that of the calendering operation for producing a conventional cushion gum sheet. Moreover, the lip which in the direction of rotation of the casing, is downstream of the intended flow of cushion gum, protrudes beyond the other lip by an amount which exceeds the median thickness of the layer of cushion gum to be applied and is shaped as an applicator shoe contacting the buffed crown of the casing by having A. in the plane through the center plane of the casing, a curvature, not necessarily completely circular, having in part a radius at least equal to the biggest buffing radius of any tire, so that under a strong approach pressure (pressing force) of the extruder the casing can be deformed and conform to this curve, and B. in the direction of the rotation of the casing, a chamfer of a depth varying along said curve.

Thereby, in operation, cushion gum is extruded into an agglomeration next to this applicator shoe and is drawn in hydrodynamic flow into the chamfer between this applicator shoe and the rotating casing, making the agglomeration act in the manner of a "rolling bank" of a mill or calender from which the cushion gum is forced with the approach pressure (pressing force) of the extruder into the depressions (roughness) of the buffed surface and into any skives that may be present. The strong approach pressure of the extruder, by forcing the crown of the buffed casing into conformity with the curve of the applicator shoe, eliminates the necessity of changing dies for varying buffing radii of the different casing.

A chamfer which is deep in the center and which is reduced to almost zero towards the sidewalls will build up most pressure on the cushion gum flowing in the center, to counteract the pressure peak of the applicator shoe deforming the casing surface there against the stiffness of the steel belt. When properly designed, this will lead to the surprising result that a substantially even thickness of cushion gum across the crown is generated, as required for precure retreading.

Conversely, a chamfer which is shallow in the center and becomes deeper towards the shoulders results equally surprising in a thickening of the cushion gum towards the shoulders, as may be required for the "base" gum in molding retreading.

The applicator shoe may also be provided with a separate heating element, preferably electrical, which serves to raise its temperature above that of the extruded cushion gum to facilitate an "ironing" action. The cycle of tire building takes usually at least 3 minutes, so that the cushion gumming should take about one minute or less, and this heating element may be switched to operate only to assist this ironing action, allowing the applicator shoe to return to the lower temperature of the surrounding metal mass of the extrusion head during the rest of the cycle.

BRIEF DESCRIPTION OF THE DRAWINGS

Objects and advantages of the present invention will appear more clearly from the following specification in conjunction with the accompanying drawings, in which:

FIG. 4 is a sectional, diagrammatic view of a detail of FIGS. 1, 2 or 3, showing a part of a tire casing being flattened by the applicator shoe of the inventive extruder and having the cushion gum layer applied and skives filled in the manner of the invention;

FIG. 5 similarly shows the contour of the crown of the casing being flattened by the contour of the applicator shoe, with FIG. 5A indicating the distribution of radial forces in this action;

FIGS. 6 and 6A are front-views of a die according to this invention with the chamfer shaped so as to produce a layer of cushion gum of an even thickness over substantially the entire width of the buffed crown of the casing, with FIG. 7 indicating this effect on a section of a casing;

FIGS. 8 and 8A are front-views of an inventive die with the chamfer shaped to produce a thickening of the layer of cushion gum towards the sidewalls; and FIG. 9 indicates this effect on a section of a casing, showing also the tread rubber blank on top of the cushion gum, as it may appear after tire building on the embodiment of FIG. 3.

DESCRIPTION OF PREFERRED EMBODIMENTS

Figure 1:
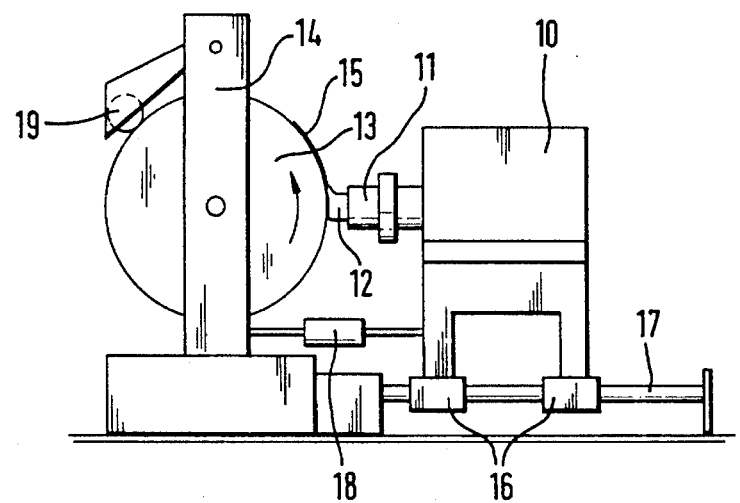
FIG. 1 shows an invention cushion gum extruder of the type CTC (Cushion-to-Casing) for use with an already existing tire builder of any make.

In the embodiment of FIG. 1, the shown cushion gum extruder 10 is provided with an extrusion head 11 and an extrusion die 12 according to this invention. The extrusion die 12 will be described in detail in FIGS. 4 to 9. The casing 13 is mounted on a tire builder 14 of conventional construction preferably having a central drive for rotating the casing. The extruder 10 is guided in a slideable manner in the directions to and from the casing, by means of four ball bearing boxes 16, two of which are shown. They allow for easy gliding of the extruder on rails 17. A working cylinder 18 moves the extruder relative to the tire builder, preferably pneumatically. This provides for an easily adjustable approach force for the applicator shoe of the die 12 for deforming the casing 13, as will be described infra.

The tire builder incorporates a stitching device 19 for the precured tread after having been applied to the cushion-gummed surface 15 of the casing in a known manner.

Figure 2:
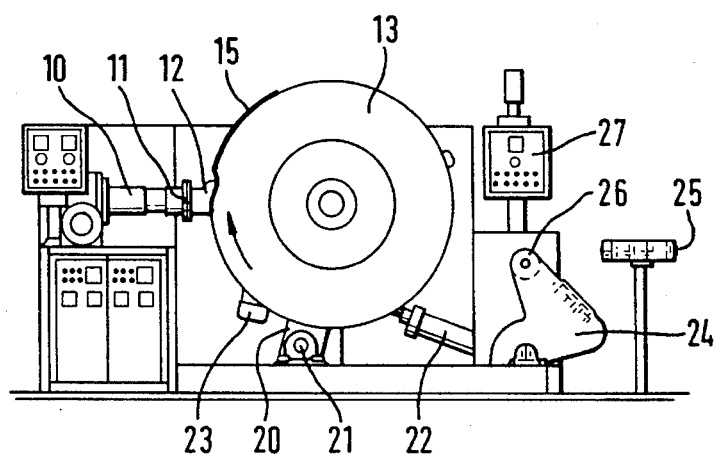
FIG. 2 shows an inventive cushion gum extruder as part of an integrated unit of the type CTC as a Swing-Builder (TYPE CTC-SB) with which the tread can be applied also.

FIG. 2 shows an integrated unit of cushion gum extruder and tire builder, like numerals indicating like parts as in FIG. 1. In place of a mechanism providing for horizontal displacement of the extruder relative to the casing, here the tire builder features a swing arm 20 moved about the pivot 21 by a linear screw drive 22 powered by an electric motor 23.

This arrangement provides for the tire casing, in the position shown, to move in a circular arc which approximates to the horizontal and to be pressed substantially radially against the inventive extruder die. The approach force (pressing force) is monitored by the drive motor 23 of the linear screw drive 22 acting on the swing arm 20.

In movements away from the extruder 10, the swing arm 20 can serve to allow for easy mounting of the casing from the floor as well as pressing the casing against the tread applicator and stitching unit 24, which can be pivoted towards the casing for guidance of the precured tread from the roller table 25 and for applying at least the stitching force against the casing by means of the roller 26.

This embodiment produces a particularly effective and fast integration of all the steps of tire building for a precure process, details of which may be taken from German patent application DE-A1-42 03027, the disclosure of which is herewith incorporated by reference.

In both units shown, the various movements of the parts relative to one another as well as the extruder speed can be coordinated by a process control unit, various actions thereof being initiated and, where needed, defined by an operator via a control-panel 27 shown in FIG. 2, but equally applicable to FIG. 1.

This applies particularly to coordination of the rotation of the casing, of the relative displacement and pressing force between the die and the casing, and the timing of the starting and stopping of rotation of the casing and of the extruder screw. This will be more particularly described with reference to figures explained in further detail infra.

Figure 3:
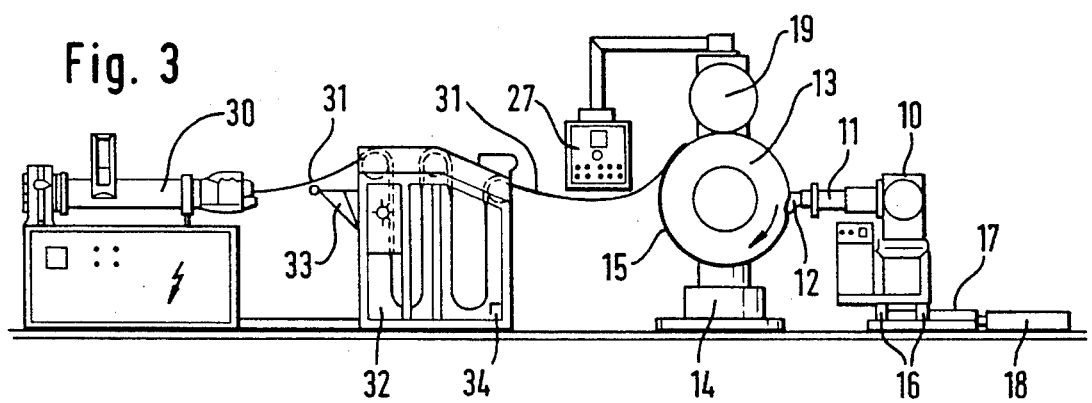
FIG. 3 shows a further embodiment with the inventive cushion gum extruder of FIG. 1 employed in a known tread extruder applicator line for mold cure retreading.

FIG. 3 shows an embodiment similar to FIG. 1, like numerals denoting like parts, wherein a tire builder with a tread extruder for mold curing is employed. The embodiment comprises a tread extruder 30 feeding the extruded tread blank 31 into a 2-loop accumulator 32 which is controlled by dancer potentiometer 33 in a known manner. The accumulator loop control 34, operating in a well known manner, stops the extruder when the loops are full and restarts it after withdrawal of tread for tire building. However, the speed of the tread extruder 30 is preferably set to simply provide for increases and decreases of the loops without interruption so that a stable tread extrusion is provided.

An operator positioned near the control panel 27 will load and unload the casing and apply the tread, cutting it by a knife. He will also form the tread splice and will operate the stitching device 19 in a known manner.

The action of the cushion gum extruder is automated as described in the following. Automation may also be used for the tread application, cutting, splice formation, and stitching.

However, the simplest version of tread handling here shown suffices to illustrate the present invention. However, as far as the cushion gum extruder in this and in the further examples is concerned, it operates so as not to interfere with the operation of tire building essentially performed by one man.

FIGS. 4, 5 and 6 show the downstream lip of the inventive extrusion die 12 in contact with the crown of the casing 13. The lip is shaped in the form of an applicator shoe 40.

The shoe 40 has a vertical distance to the lower lip 41, this distance defining the depth of the die. It also projects past the lower lip 41 towards the casing by a second distance. The second distance is always a multiple of the median thickness of the layer 15 of the cushion gum to be applied.

These features effect that the extruder can operate against a low die resistance with an extrusion temperature similar to the conventional calendering temperatures and that adjacent to the applicator shoe 40 an agglomeration of rubber is formed.

The chamfer 42 of the applicator shoe 40 is oriented such that the surface of the applicator shoe 40 is at an increasing distance from the tire surface in a direction toward the second lip (lower lip 41), as shown in the drawing FIG. 4, and causes rubber to be drawn by the rotation of the tire under the contact surface with the buffed crown. Moreover, the chamfer makes the agglomeration of rubber act like a "rolling bank" of a mill or a calender, from which the layer of cushion gum is formed with a thickness determined by the size of the rolling bank, the magnitude of the approach pressure (pressing force) of the extruder, and the deformation resistance of the crown of the casing.

The size of the rolling bank, on the other hand, will determine what size of holes or skives can reliably be filled under the pressing force of the extruder to ensure in-depth penetration, and a bigger rolling bank can supply a group of holes or skives occurring adjacent to one another, without interrupting the intervening thin layer of cushion gum.

An electrical heating element 43 may be provided for heating the applicator shoe to a temperature above that of the rubber mass. The heating element 43 may be switched to operate only during the cushion gumming operation, corresponding to, for example, one fourth of the entire tire building process, so that the shoe returns almost immediately to the temperature of the surrounding metal mass during the remaining steps of the tire building cycle. In FIG. 4, reference numeral 49 indicates open skives and 48 indicates some filled skives in the surface of the carcass.

FIG. 5 provides an illustration of the deformation of the casing, and FIG. 5A indicates a pattern of pressure variation across the crown due to the varying resistance to deformation of the steel belt of the casing.

FIGS. 5 and 6 show also the side pieces 45, which are slideably adjustable by any suitable mechanism, not shown, to accommodate different crown widths of casings.

FIG. 5 shows two versions of such side pieces 45 which differ by having different forward projections: Projections 46, see also FIG. 6, is designed to limit the width of the cushion gum exactly to the width of the crown; projection 47 allows for the agglomeration of rubber to reach to a certain length down the flank (sidewall) of the casing to provide a covering of cushion gum there also.

FIG. 6 shows the applicator shoe 40 with its chamfer 42 which is deeper in the center and becomes shallower towards the flanks, also shown diagrammatically in FIG. 6A.

FIG. 7 shows a section of a casing 13 provided with a thin and substantially uniform layer of cushion gum by the shoe chamfered as in FIG. 6, with side pieces 46.

FIG. 8 shows an applicator shoe 50 with a chamfer 51 which is shallower in the center and becomes deeper towards the flanks, as indicated on the detail sections diagrammatically shown on FIG. 8A.

FIG. 9 shows the cushion gum layer 52 resulting from this, which becomes thicker on the flanks. Using also a side piece 47, the cushion gum reaches to a certain length down the flanks of the casing. 53 shows the corresponding tread blank as it would appear after complete tire building on the embodiment of FIG. 3.

In a preferred mode of operation, the rotation of the casing will be started a predetermined small period of time before the activation of the extruder, so that the thickness of the cushion gum builds up from a thin film barely covering the roughnesses of the buffed surface until the extruder has reached its preset speed. After the casing has completed substantially a full rotation, the extruder speed is reduced to zero over substantially the same distance that was used to build up the full thickness of the cushion gum layer. Over this distance, the "rolling bank" is reduced to nothing so that a very smooth splice is formed. In this way, there is no waste, and for the next tire a newly formed rolling bank will be used.

Since, as mentioned, the size of the rolling bank and the approach pressure of the extruder determine what size skives can be filled, it should be noted as a surprising result that the skive-filling with the inventive apparatus is more reliable than that performed by an operator, who always must take due care and pay close attention in this task. The inventive effect may be aided by cushion gums more specifically formulated for the filling purpose and also for the purpose of adhesion without rubber solution spraying, although good results have been obtained with normal cushion gum material presently available.

With respect to the extrusion temperature a direct comparison with the aforementioned U.S. Pat. No. 5,162,070 can be drawn: In order to achieve a cushion gum application time of 1 minute for a truck tire of the size 12-R-22.5, an extruder speed of 100 rpm against the die resistance of a slot of 0.4 mm width mush be employed, resulting in a cushion gum layer of 1 mm thickness at an extrusion temperature of approximately 90° C. With an inventive extruder die of a slot width of 2.8 mm the extruder can be operated at 40 rpm resulting in an extrudate temperature of 80° C.

The present invention is, of course, in no way restricted to the specific disclosure of the specification and drawings, but also encompasses any modifications within the scope of the appended claims.

What I claim is:

1. A tire retreading device comprising:

an extruder for extruding a cushion gum layer onto said tire casing, said extruder having a first and a second lip defining an extrusion die, wherein said first lip projects in a direction toward said tire casing past said second lip;

a means for rotating said tire casing past said extrusion die, wherein said protruding first lip is arranged downstream of said second lip in a direction of rotation of said tire casing;

a means for pressing said die into forceful contact with said tire casing, wherein said first lip is an applicator shoe that is pressed against said tire casing so as to deform said tire casing, wherein said applicator shoe has a surface facing said tire casing, wherein said surface has a chamfer that extends at an angle to a surface of said tire casing, said chamfer oriented such that the surface of said applicator shoe is at an increasing distance from the tire surface in a direction toward said second lip and counter to said direction of rotation of said tire casing; and a tread feeding device for feeding the tread to said tire casing after extrusion of said cushion gum layer onto said tire casing.

2. A tire retreading device according to claim 1, wherein said angle is 2° to 50°.

3. A tire retreading device according to claim 2, wherein said angle is 10° to 30°.

4. A tire retreading device according to claim 1, wherein said applicator shoe projects by a length corresponding to three to fifteen times a thickness of said cushion gum layer past said second lip of said extruder.

5. A tire retreading device according to claim 4, wherein said length is substantially ten times the thickness of the cushion gum layer.

6. A tire retreading device according to claim 1, wherein between said applicator shoe and said second lip a spacing is provided that is substantially two to twelve times a thickness of the cushion gum layer.

7. A tire retreading device according to claim 6, wherein said spacing is substantially eight times the thickness of the cushion gum layer.

8. A tire retreading device according to claim 1, wherein said applicator shoe has a radius of curvature selected to be greater than a greatest radius of a surface of the tire casing.

9. A tire retreading device according to claim 1, wherein said extruder comprises a means for heating the cushion gum of the cushion gum layer only to a temperature of less than 80° C.

10. A tire retreading device according to claim 1, wherein said angle of said chamfer varies over the width of said tire casing.

11. A tire retreading device according to claim 10, wherein said angle of said chamfer of said applicator shoe is greatest at a center plane of the tire casing.

12. A tire retreading device according to claim 10, wherein said applicator shoe has a negative curvature so that said chamfer is greatest at sidewalls of the tire casing.

13. A tire retreading device according to claim 1, wherein said applicator shoe comprises a heating device for heating said applicator shoe during application of the cushion gum layer. and damaged areas of the surface of the tire casing are completely filled.

14. A tire retreading device according to claim 1, wherein said extruder has means for controlling electronically a supply of cushion gum to said extruder, wherein a gum rolling bank formed by the cushion gum is used as an indicator for controlling the supply by said means for controlling, said gum rolling bank being formed opposite said applicator shoe and being maintained by supplying new cushion gum at a level such that depressions and damaged areas of the surface of the tire casing are completely filled.

15. A tire retreading device according to claim 14, wherein said applicator shoe has lateral forming projections connected laterally to said applicator shoe and an adjusting device connected to said lateral forming projections for adjusting a distance between said lateral forming projections to the width of the tire casing, wherein said lateral forming projections serve to guide the gum rolling bank.

\* \* \* \* \*